United States Patent [19]

Moskovich

[11] Patent Number: 5,200,861
[45] Date of Patent: Apr. 6, 1993

[54] LENS SYSTEMS

[75] Inventor: Jacob Moskovich, Cincinnati, Ohio

[73] Assignee: U.S. Precision Lens Incorporated, Cincinnati, Ohio

[21] Appl. No.: 766,763

[22] Filed: Sep. 27, 1991

[51] Int. Cl.$^5$ .................. G02B 13/22; G02B 13/18
[52] U.S. Cl. .................. 359/662; 359/663; 359/708; 359/740; 359/752; 359/753
[58] Field of Search ........ 359/662, 663, 708, 713–716, 359/740, 752, 753

[56] References Cited

U.S. PATENT DOCUMENTS

| | | | |
|---|---|---|---|
| 706,650 | 8/1902 | Goerz | 359/794 |
| 2,031,792 | 2/1936 | Richter | 359/737 |
| 3,947,094 | 3/1976 | Ikemori | 359/751 |
| 4,189,211 | 2/1980 | Taylor | 359/663 |
| 4,300,817 | 11/1981 | Betensky | 359/651 |
| 4,425,028 | 1/1984 | Gagnon et al. | 359/246 |
| 4,441,792 | 4/1984 | Tateoka | 359/663 |
| 4,461,542 | 7/1984 | Gagnon | 359/41 |
| 4,511,223 | 4/1985 | Hirose | 362/268 |
| 4,637,690 | 1/1987 | Miyamae et al. | 359/683 |
| 4,826,311 | 5/1989 | Ledebuhr | 353/31 |
| 4,913,540 | 4/1990 | Minefuji | 359/663 |
| 4,925,279 | 5/1990 | Shirota | 359/206 |

FOREIGN PATENT DOCUMENTS

| | | |
|---|---|---|
| 311116 | 4/1989 | European Pat. Off. . |
| 373677 | 6/1990 | European Pat. Off. . |
| 603938 | 4/1978 | U.S.S.R. . |
| 1007068 | 3/1983 | U.S.S.R. . |
| 1048444 | 10/1983 | U.S.S.R. . |
| 1089535 | 4/1984 | U.S.S.R. . |

*Primary Examiner*—Scott J. Sugarman
*Attorney, Agent, or Firm*—Maurice M. Klee

[57] ABSTRACT

A lens system is provided which includes two lens units. The first lens unit includes two meniscus lenses whose concave surfaces face each other and the second lens unit has a positive power. The system can be configured to have a wide field of view and/or to be telecentric. In its basic form, a well-corrected lens having a relatively large aperture and field of view is achieved through the use of only three lens elements.

47 Claims, 8 Drawing Sheets

LENS SYSTEMS

BACKGROUND OF THE INVENTION

1. Field of the Invention

This invention relates to lens systems and, in particular, to lens systems having a wide field of view and/or telecentric properties. Among other applications, such systems can be used as projection lenses for projection televisions.

2. Description of the Prior Art

In general terms, the field of view of a lens system determines what proportion of the surface of an extended object can be imaged by the system. More precisely, the field of view is defined as the angle which the entrance window subtends at the center of the entrance pupil, where the entrance window and the entrance pupil are, respectively, the images of the field stop and the aperture stop in object space, i.e., the images of those stops by those elements of the system which precede the stop.

Lens systems having a field of view greater than about 20-25 degrees (half or semi-field) are generally considered to be wide angle systems. Such systems are used extensively in projecting, recording, and copying applications where a product having a compact size is desired. In particular, projection television systems normally employ a projection lens having a wide field of view.

Telecentric lens systems are defined in terms of the location of the system's exit and/or entrance pupils or equivalently in terms of principal rays. As indicated above, the entrance pupil of a lens system is the image of the system's aperture stop in object space. Similarly, the exit pupil is the image of the aperture stop in image space. That is, the entrance pupil is the image of the aperture stop produced by the elements of the system which precede the aperture stop, and the exit pupil is the image produced by the elements which follow the aperture stop. The principal ray emanating from an off-axis object point is that ray which passes through the middle of the aperture stop. Since the exit and entrance pupils are images of the aperture stop, the principal ray also intersects the axis of the optical system at the locations of the pupils in the absence of aberrations.

A telecentric lens system is a lens system which has at least one of its pupils at infinity. In terms of principal rays, having a pupil at infinity means that the principal rays are parallel to the optical axis a) in object space, if the entrance pupil is at infinity, or b) in image space, if the exit pupil is at infinity. Since light can propagate through the lens system in either direction, the pupil at infinity can serve as either an entrance or an exit pupil depending upon the system's orientation with respect to the object and the image. Accordingly, the term "telecentric pupil" will be used herein to describe the system's pupil at infinity, whether that pupil is functioning as an entrance or an exit pupil.

In practical applications, the telecentric pupil need not actually be at infinity since a lens system having an entrance or exit pupil at a sufficiently large distance from the system's optical surfaces will in essence operate as a telecentric system. The principal rays for such a system will be substantially parallel to the optical axis and thus the system will in general be functionally equivalent to a system for which the theoretical (Gaussian) location of the pupil is at infinity. Accordingly, as used herein, the term "telecentric lens system" is intended to include lens systems which have at least one pupil at a long distance from the lens elements, and the term "telecentric pupil" is used to describe such a pupil at a long distance from the lens elements.

Optical systems having telecentric properties have typically been used in applications where a beam of light needs to be perpendicular to an object plane or an image plane. For example, in measurement (metrology) applications such as contour projectors used to check the dimensions of small mechanical parts, systems having telecentric entrance pupils are often used since measurements made in the image plane for such systems are relatively insensitive to defocussing of the system. See, for example, Hirose, U.S. Pat. No. 4,511,223, and Miyamae et al., U.S. Pat. No. 4,637,690. Similarly, telecentric systems have been used in laser beam scanners and in fiber optic systems where images are relayed through multiple fiber bundles. See, for example, Shirota, U.S. Pat. No. 4,925,279, and EPO Patent Publication No. 373,677.

Telecentric lens systems have also been used in the field of projection television and, in particular, for projection television systems using liquid crystal displays (LCDs) as light valves. Such systems can be of the transmissive type where light comes in from behind the liquid crystal panel and is modulated as it passes through the panel or of the reflective type where light enters through the front of the panel and is reflected back out towards the screen after having been modulated. See, for example, Taylor, U.S. Pat. No. 4,189,211, Gagnon et al., U.S. Pat. No. 4,425,028, Gagnon, U.S. Pat. No. 4,461,542, Ledebuhr, U.S. Pat. No. 4,826,311, Minefuji, U.S. Pat. No. 4,913,540, EPO Patent Publication No. 311,116, and Russian Patent Publication No. 1,007,068.

In either case, the modulated light leaving the panel for the screen tends to be oriented perpendicular to the face of the panel, e.g., the cone of light leaving each pixel of the panel has a half angle on the order of 10°. In contrast, the light leaving the phosphor screen of a cathode ray tube propagates in all directions, i.e., the screen functions as a Lambertian source. Accordingly, lens systems designed for use with cathode ray tubes are not particularly efficient when used with a liquid crystal panel. Telecentric systems, on the other hand, with their parallel principal rays are well-suited for gathering in the quasi-parallel light leaving the face of a liquid crystal panel and transferring that light to an image screen.

In view of their numerous applications, a wide variety of designs have been developed for telecentric lenses. See, for example, Ikemori, U.S. Pat. No. 3,947,094, Tateoka, U.S. Pat. No. 4,441,792, and Russian Patent Publications Nos. 603,938, 1,048,444, and 1,089,535. Generally, these designs have suffered from a number of drawbacks. For example, in order to keep the aperture stop at a place where it will be imaged at a long distance from the system's optical elements, prior art telecentric lens systems have typically had a limited aperture and field of view. Also, lens systems of this type have tended to be large in size and complicated in construction.

SUMMARY OF THE INVENTION

In view of the foregoing state of the art, it is an object of the present invention to provide a novel lens structure which can provide a wide field of view and/or which can be telecentric. It is a further object of the invention to provide lens systems of the foregoing type which have an overall short length.

It is a specific object of the invention to provide telecentric lens systems which have a large field of view and a relatively high aperture. It is a further specific object of the invention to provide telecentric lens systems which have a relatively small size and which can be easily constructed. It is an additional specific object of the invention to provide telecentric lens systems which include a small number of elements.

To achieve these and other objects, the invention provides a lens system which includes two lens units or groups separated by an air gap. The typical properties of the two units are as follows: 1) the first unit contains the system's aperture stop, 2) the first unit includes two meniscus elements whose concave surfaces face each other, 3) the aperture stop is located between the two meniscus elements, 4) the combined optical power of the two meniscus elements is negative, and 5) the second unit has a positive power.

In certain embodiments of the invention, the lens system has a wide field of view, with the half or semi-angle of the field being greater than 20 degrees and, preferably, greater than 30 degrees. In other embodiments, the lens system covers a field of view having a half angle larger than 30 degrees, and additionally, has a telecentric pupil. In all the embodiments, the pupil located farthest from the lens is obtained by the imaging of the aperture stop by said second lens unit.

The lens system of the invention can be practiced with just three lens elements—two meniscus lenses as the first unit and a positive lens as the second unit. As illustrated by the examples presented below, additional elements can be included in the units to aid in the correction of aberrations and to provide the desired overall power of the system. As also illustrated below, in many cases, the two meniscus elements can be identical which helps reduce the overall cost of the lens system.

Each of the first and second units preferably includes one or more aspheric lens surfaces. These aspheric surfaces are used to correct lens abberations and thus allow for a large field of view and a large aperture. Also, when the lens system is telecentric, the aspheric surface(s) of the second group serve to correct aberrations in the imaging of the aperture stop to form the telecentric pupil and, in particular, to correct spherical aberration of the exit/entrance pupil which can cause variations in the parallelism of different principal rays with respect to the system's optical axis.

The accompanying drawings, which are incorporated in and constitute part of the specification, illustrate preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

Figure 1:
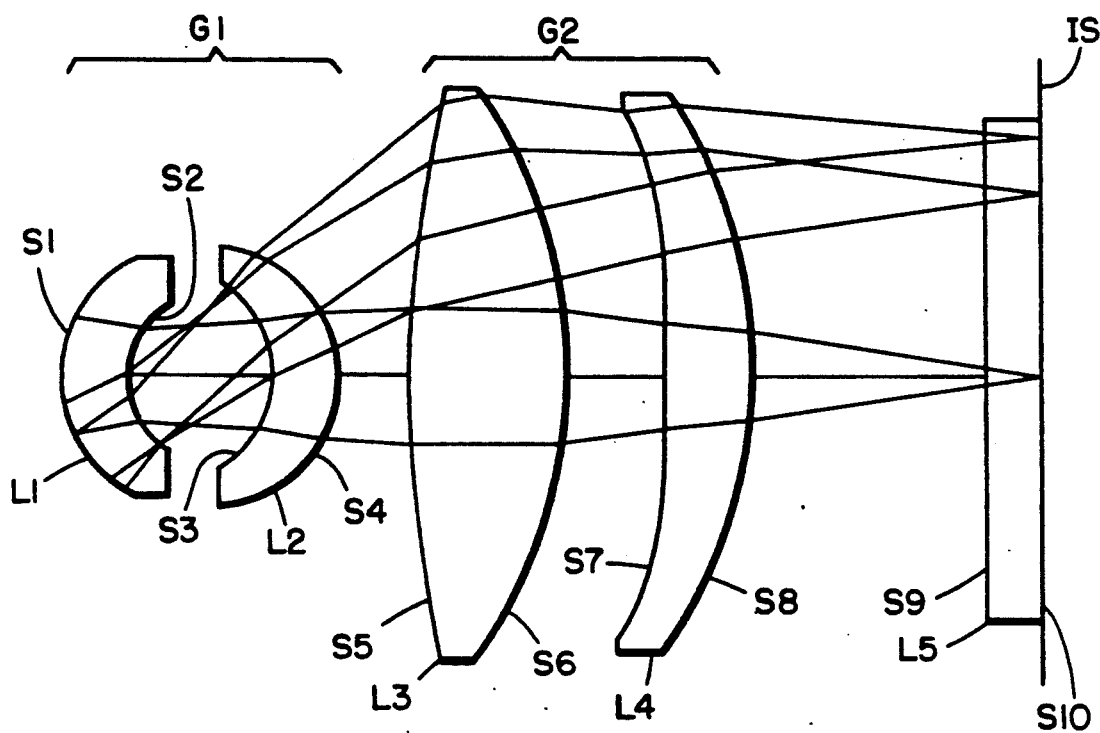
FIGS. 1 through 15 are schematic side views of lens systems constructed in accordance with the invention.
Figure 2:
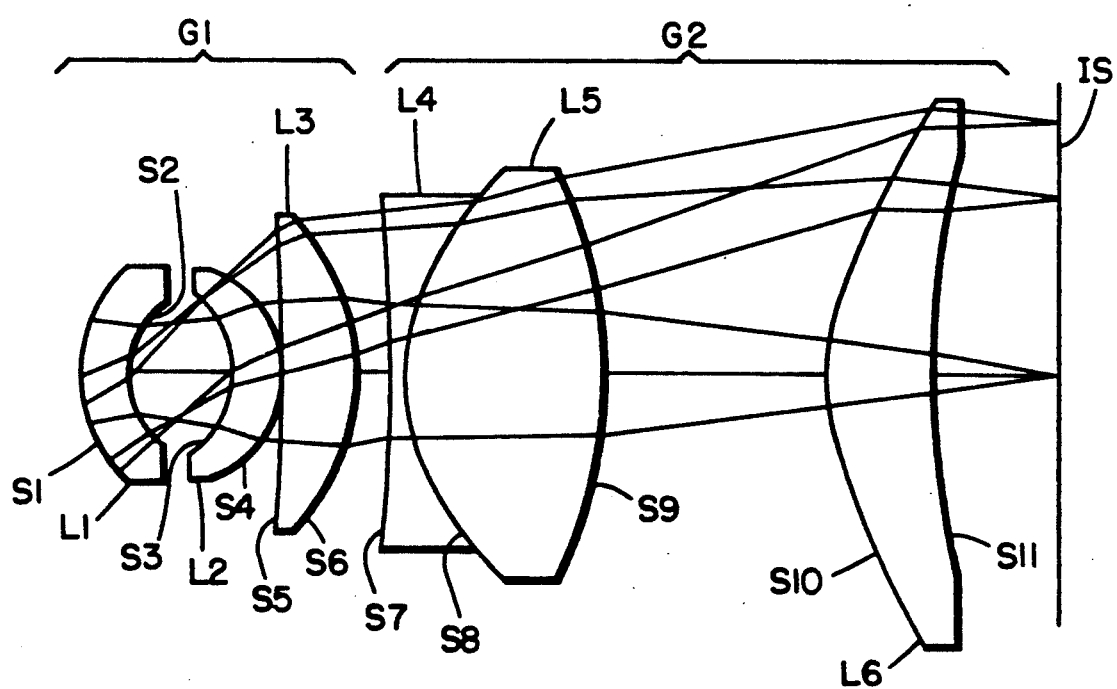
Figure 3:
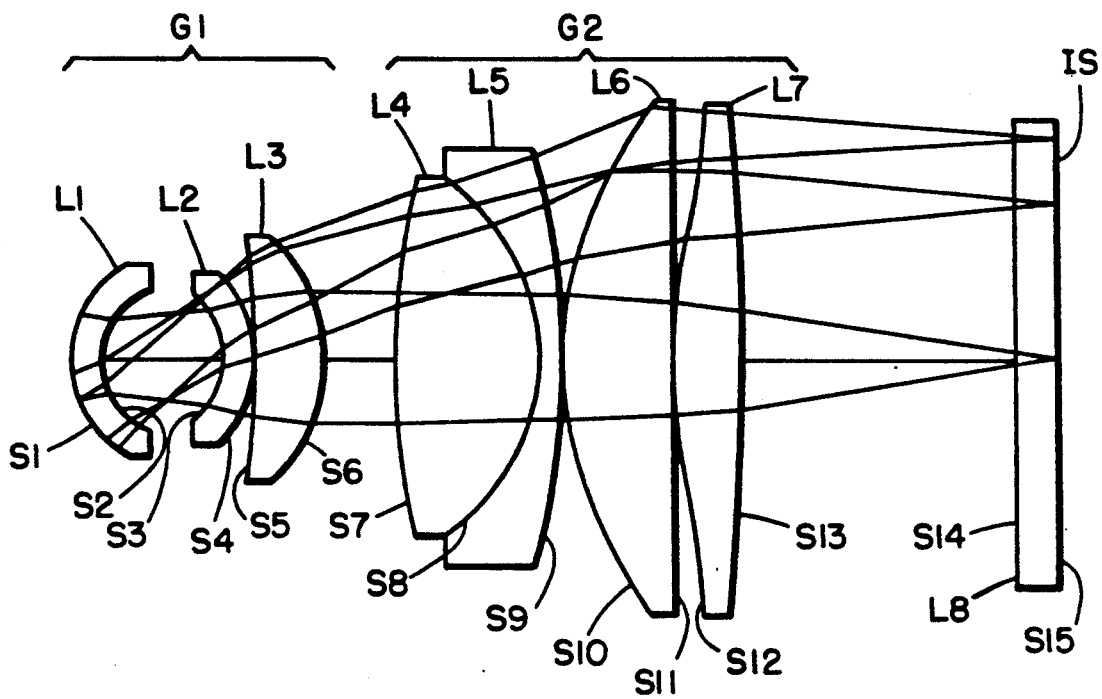
Figure 4:
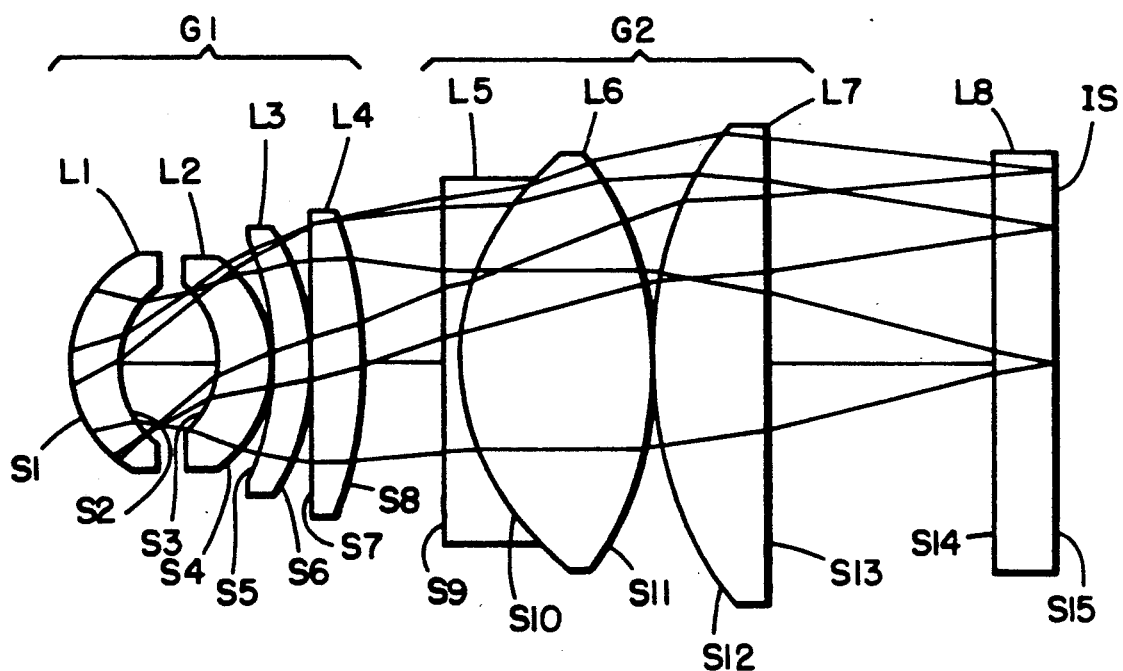
Figure 5:
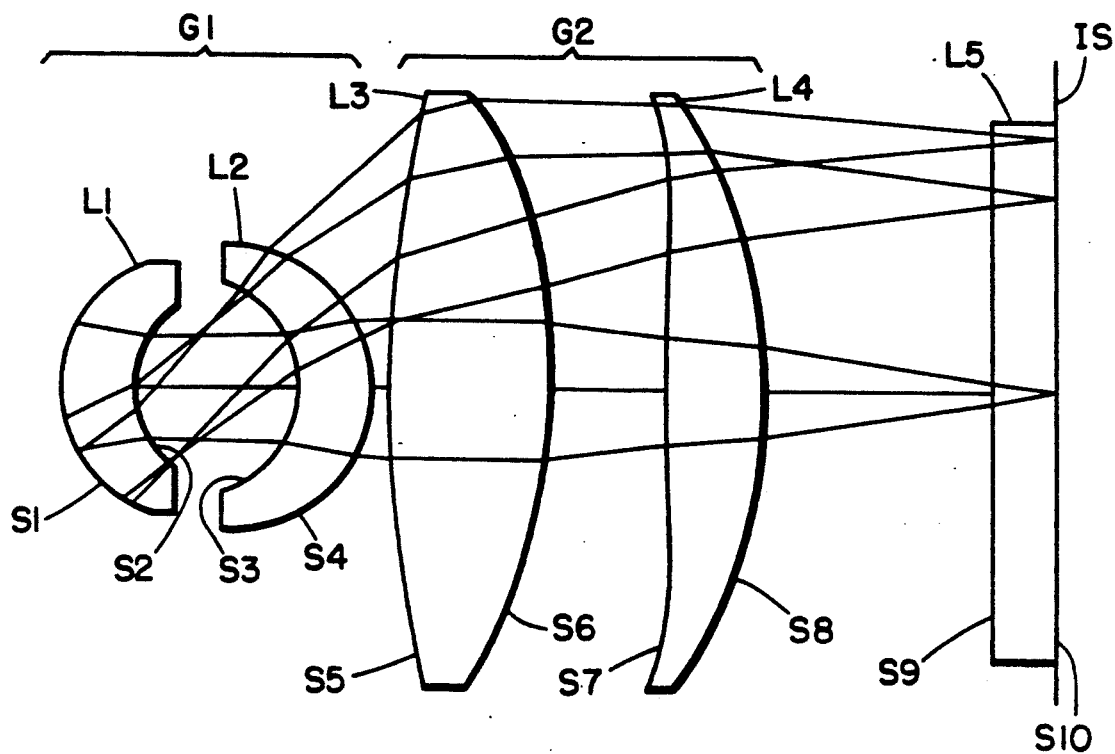
Figure 6:
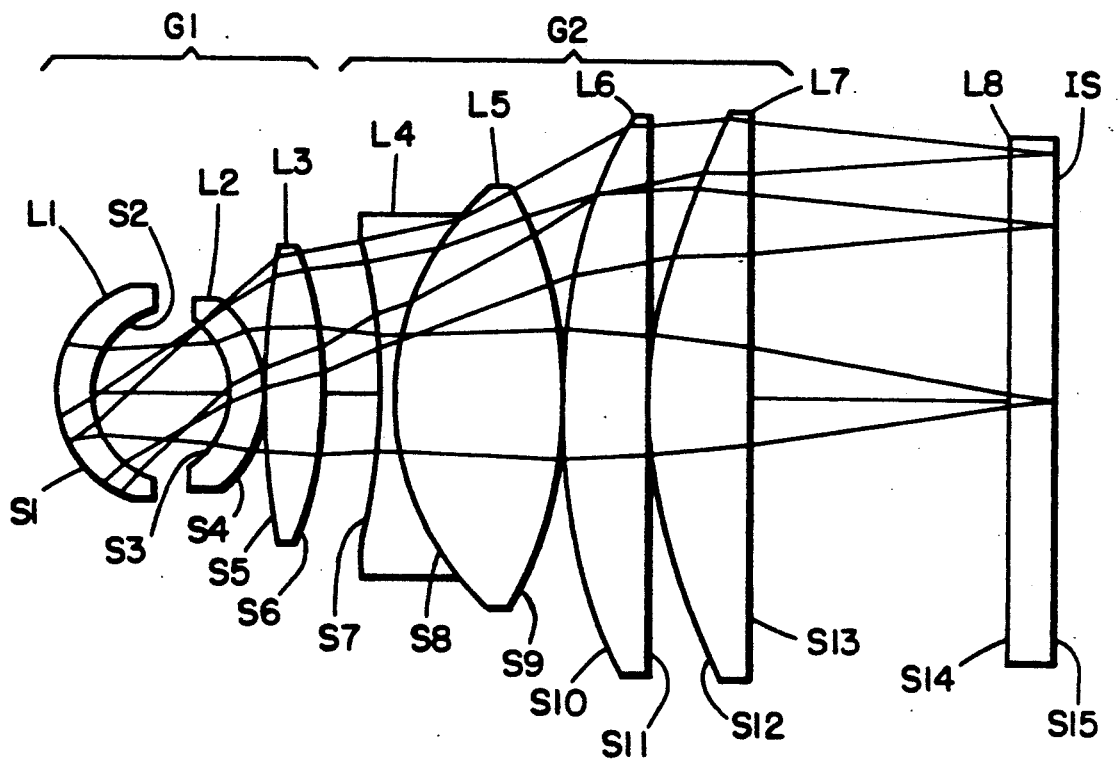
Figure 7:
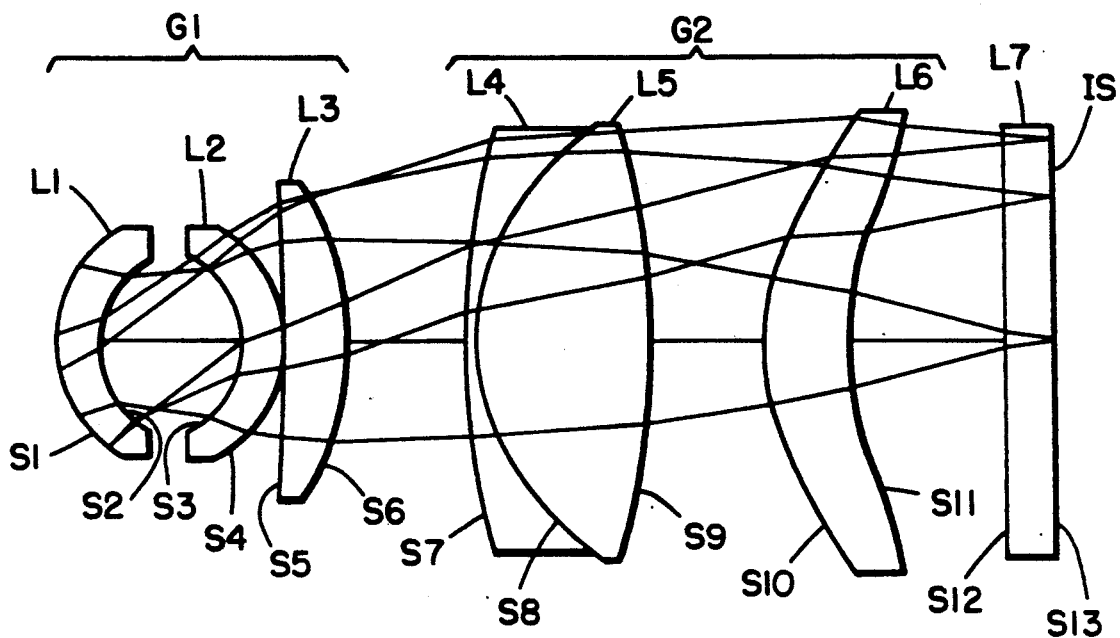
Figure 8:
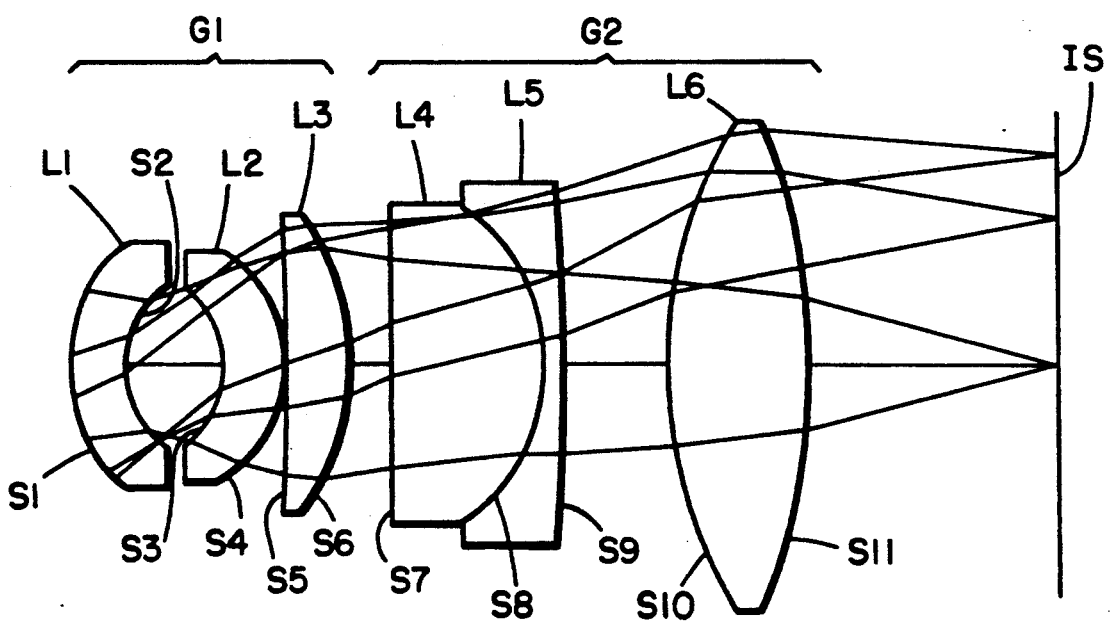
Figure 9:
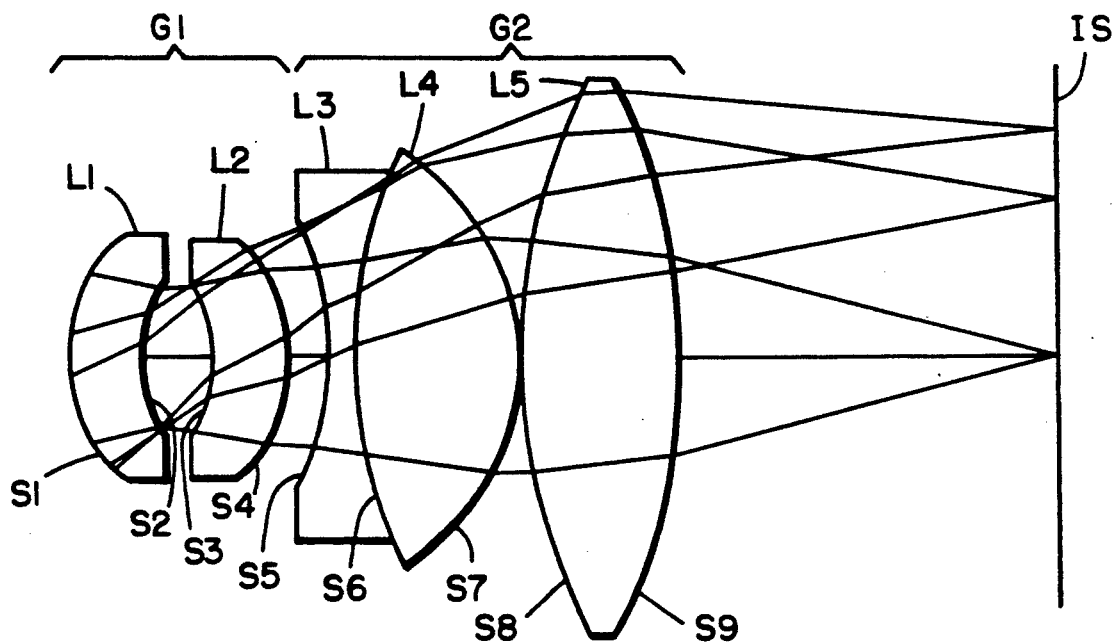
Figure 10:
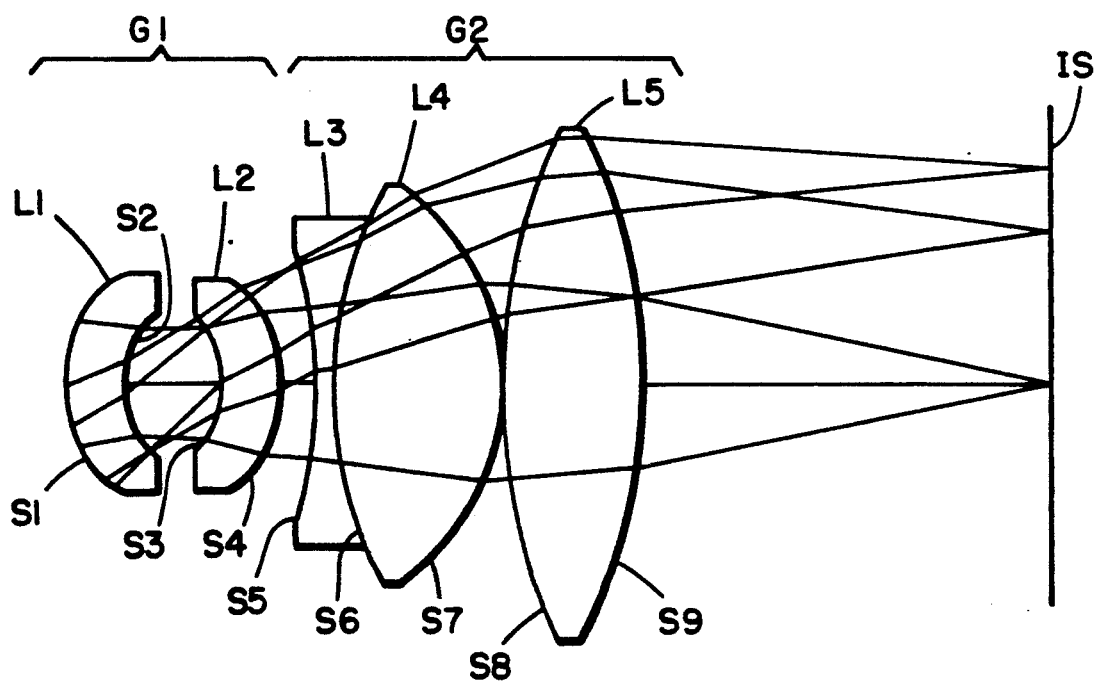
Figure 11:
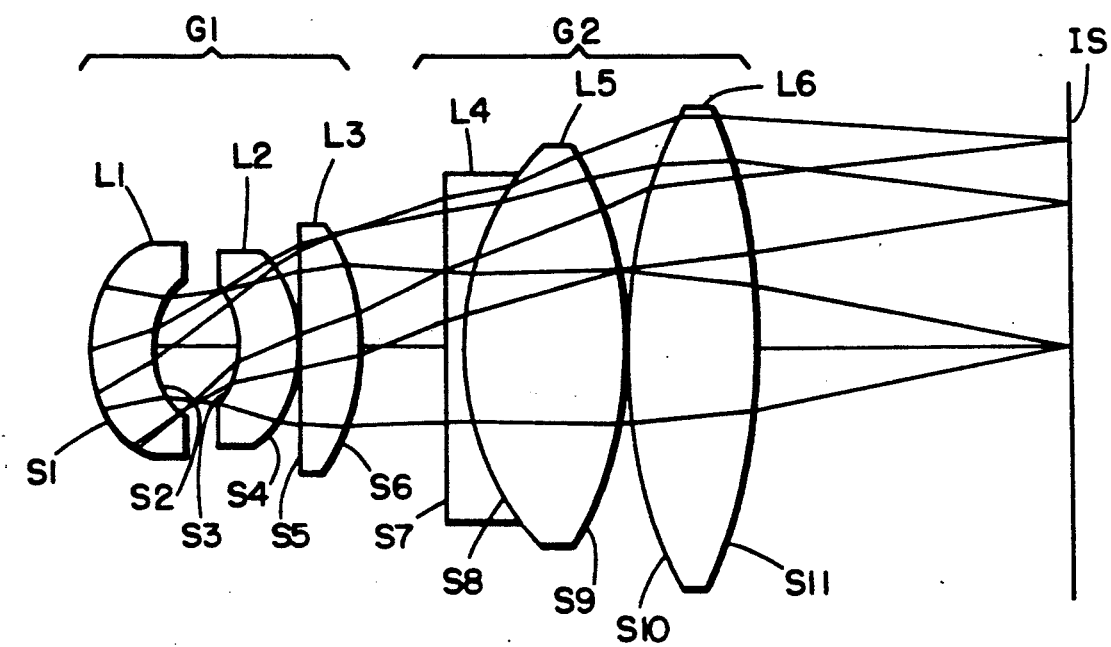
Figure 12:
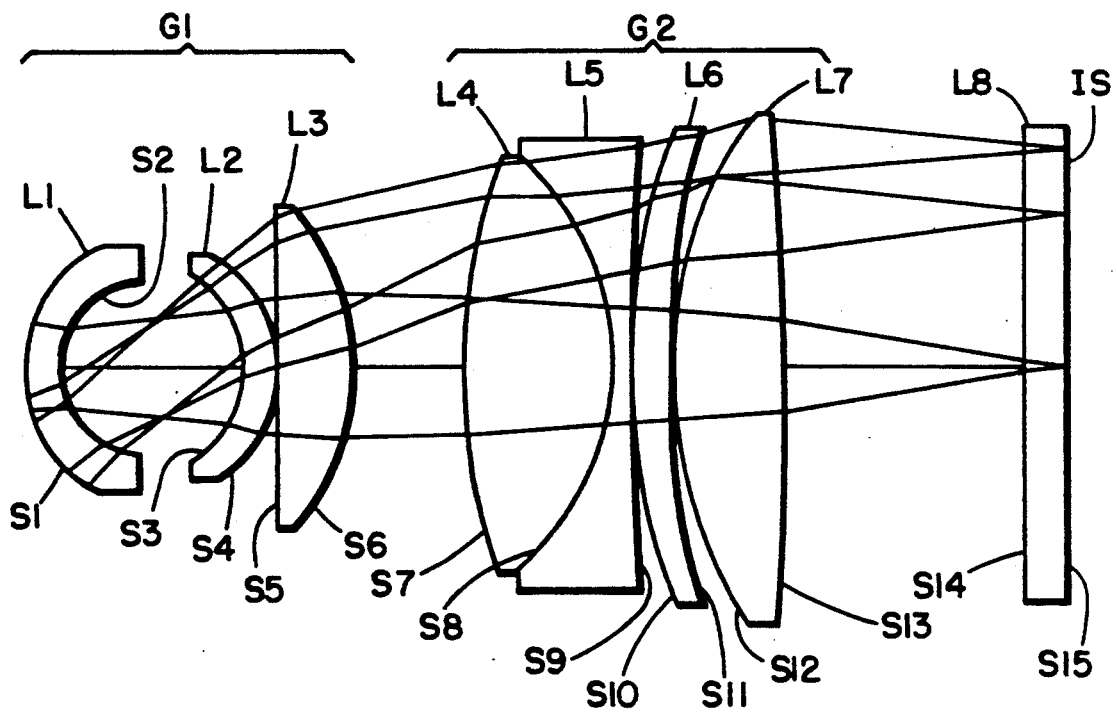
Figure 13:
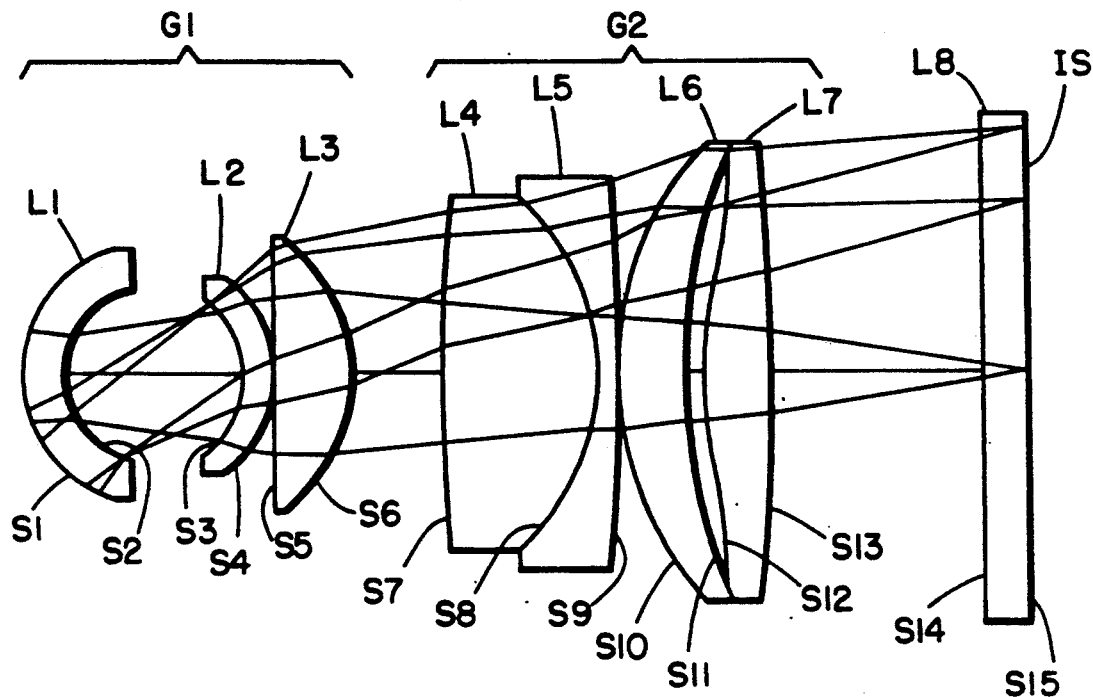
Figure 14:
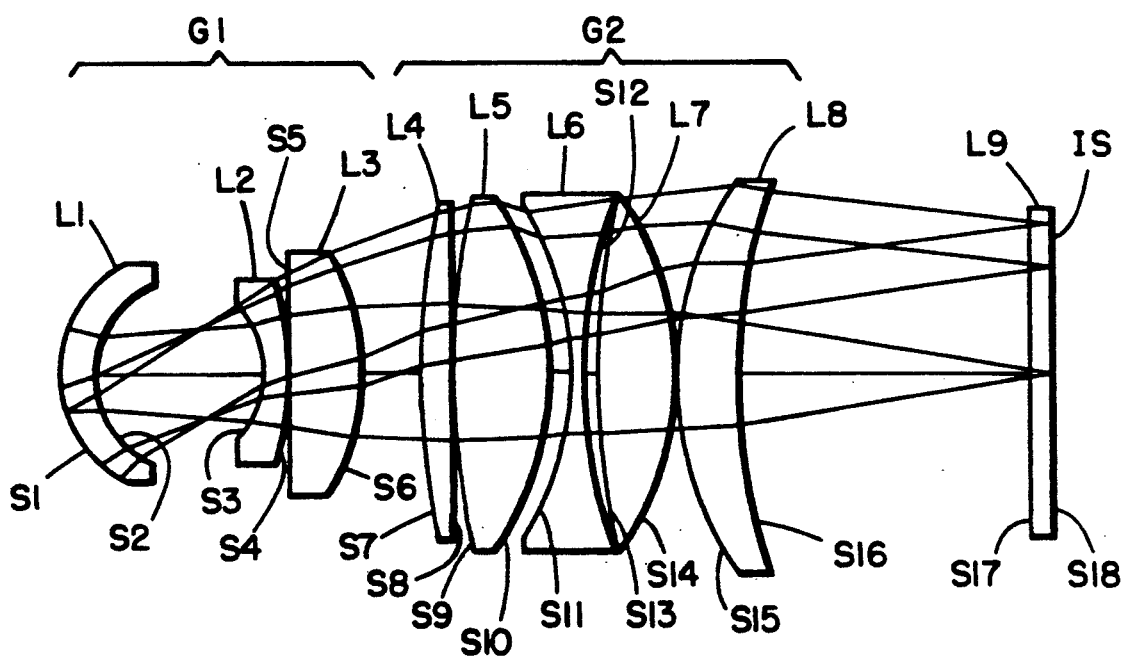

As discussed above, the present invention relates to lens systems having two lens units wherein the first unit has two meniscus elements whose concave surfaces face each other and the second unit is of positive power and is separated by an air space from the first unit.

The first unit contains the system's aperture stop which is located between the two menisci. The stop can be a lens mount, a separate aperture, or a variable diaphragm depending upon the particular application.

Each of the menisci will typically have a relatively weak negative power, although in some cases one of the elements can be weakly positive. In order to achieve good correction of field curvature (see below), the combined power of the menisci should be negative. For many applications, the same lens can be used for both menisci which reduces the overall cost of the system.

The menisci preferably have aspheric surfaces in order to correct aberrations in the overall image produced by the system. In particular, the aspheric surface serve to correct aperture dependent aberrations, e.g., spherical aberration.

As discussed above, the aperture stop of the lens system is located between the menisci. As a result of this arrangement, the odd powered aberrations of these elements, i.e., coma, distortion, and lateral color, are automatically minimized by the structure of the lens. See, for comparison, the Hypergon lens (U.S. Pat. No. 706,650) and the Topogon lens (U.S. Pat. No. 2,031,792). As a result, the aspheric surfaces of these elements can be used primarily to correct the remaining even power aberrations, i.e., spherical aberration and astigmatism, which is an important advantage of the invention.

The two meniscus elements are particularly important in correcting the field curvature of the lens. A strong bending of these elements towards each other and a combined negative power result in good compensation for the negative contribution to the Petzval sum generated by the positive second unit. Given the dominant role which the Petzval sum plays in achieving a good image quality over a large field of view, this balancing allows the lens systems of the invention to achieve a field coverage of 80° or more in some of its embodiments. See, for example, the lenses of FIGS. 1–3, 5–6, and 12–13.

It should be noted that the correction of Petzval sum for the lenses of the present invention occurs away from the short conjugate image plane, i.e., away from the right side image plane for light traveling from left to right in the figures. In terms of projection lenses for projection televisions, this is the opposite of the approach which is currently in use. In accordance with that approach, a strong negative element is located near to the short conjugate image plane, i.e., near to the CRT tube. See, for example, Betensky, U.S. Pat. No. 4,300,817.

In addition to the two menisci, the first unit can also include one or more additional lens elements. In particular, the addition of positive elements, e.g., glass elements, to the first unit has been found to be helpful in correcting axial color and spherical aberrations for lenses having higher speeds (lower f-numbers).

The second unit is spaced from the first unit and has a positive power. This unit preferably includes at least one aspheric surface to correct overall aberrations in the system, including distortion, astigmatism, and, to the extent present, coma.

With regard to distortion, the aspheric surfaces of the second group can be used to produce particular forms of distortion variation, including a f-$\Theta$ variation, where $\Theta$ is measured in radians. The lenses of FIGS. 1 and 5 exhibit such a f-Θ distortion behavior, and thus are particularly well-suited for scanner applications in which a variation of this type is often desired.

In the case of telecentric systems, the one or more aspheric surfaces of the second unit also serve to correct for aberrations in the imaging of the aperture stop to form the telecentric pupil.

If chromatic aberrations need to be controlled, a color-correcting doublet may also be used in the second unit.

FIGS. 1 to 15 illustrate various lens systems constructed in accordance with the invention. Corresponding lens prescriptions appear in Tables 1 to 15, respectively. A summary of various properties of these systems appears in Table 16. In these figures and tables, the letter "L" is used to designate individual lenses, the letter "S" to designate lens surfaces, the letters "IS" to designate the image surface, and the letter "G" to designate lens units or groups.

The $N_e$ and $V_e$ values given in Tables 1–15 represent the indices of refraction and Abbe values for the various lenses at a wavelength of 0.5461 microns. The aspheric coefficients set forth in the tables are for use in the following equation:

$$z = \frac{cy^2}{1 + [1 - (1 + k)c^2y^2 \times]^{\frac{1}{2}}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which for the lenses of Table 1–15 is zero.

In FIGS. 1–15, light is assumed to propagate from left to right, i.e., from the system's long conjugate towards its short conjugate. This corresponds to the direction of use for such applications as scanning a laser beam in, for example, a laser printer. In the case of a projection television using a liquid crystal display, light will propagate in the opposite direction, i.e., from right to left. That is, for such systems, the LCD will be located to the right of the second lens unit and the viewing screen will be located to the left of the first lens unit. In FIGS. 1, 3–7, and 12–15, an LCD-type display is schematically illustrated by the planar block to the right of G2.

To produce a full color image, three lenses and three LCD panels are generally needed, with one LCD-lens combination used to project the red component of the image, a second combination used for the green component, and a third for the blue component. Typically, the three LCD-lens assemblies are arranged next to one another so that the optical axes of the lenses are parallel, e.g., the assemblies are arranged horizontally with, for example, the red system on the left, the green in the middle, and the blue on the right.

Because the optical axes of the three lenses are displaced from one another, adjustments need to be made to ensure that the red, green, and blue images lie at the same locations on the viewing screen (i.e., that they superimpose upon one another) and that they have substantially the same intensities.

Superposition can be achieved by moving the objects for the outboard assemblies, e.g., the red and blue assemblies, relative to their respective optical axes. For example, if, as described above, the green system is in the middle and the red system is on the green system's left side, superposition of the red image onto the green image can be achieved by moving the red object to the left relative to its optical axis by an amount equal to S/M, where S is the spacing between the optical axes of the red and green systems and M is the lens' magnification. Since the lens produces an inverted image, moving the object to the left, moves the image to right, thus superimposing the red image on the green image. Similarly, for a blue assembly lying to the right of the green assembly, the object is moved to right by the quantity S/M, causing the inverted image to move to the left and thus lie at the same location as the green image and the shifted red image.

The intensity of the image produced by a lens generally decreases as one moves off of the optical axis. To a good approximation, the decrease in illumination follows the $\cos^4$ law, i.e., $E_\alpha = E_0 \cos^4 \alpha$, where $E_0$ is the intensity at the screen at the location of the optical axis and is the angle between the optical axis and a line which extends from the center of the lens' exit pupil to the point on the screen where the intensity ($E_\alpha$) is to be determined.

Because the optical axes of the red, green, and blue lenses are shifted relative to one another, there are in general three $\alpha$ values for each point on the screen, i.e., one for the red image, one for the green image, and one for the blue image. In accordance with the $\cos^4$ law, these three values result in three values for the local intensities of the three images, i.e., the three values result in color imbalances across the surface of the screen. Generally, the imbalances are greatest in the direction in which the LCD-lens assemblies are stacked next to one another (e.g., the imbalances are greatest in a horizontal direction as opposed to a vertical direction for the red-green-blue stacking described above).

The color imbalances resulting from the different $\alpha$ values can be substantially reduced by adjusting the intensity of the light projected from different portions of the red, green, and blue LCD panels. This adjustment can be achieved by placing an attenuating filter in front of and/or behind each of the panels. Preferably, the filter is placed relatively close to the panel so as to achieve control of the attenuation on essentially a light bundle by light bundle basis. The transmission characteristics of the filters are adjusted along, for example, the horizontal axis, so that the light arriving at the screen from each of the three panels has substantially the same intensity variation along the surface of the screen.

The filters can comprise a photographic emulsion on a glass plate and the desired variable transmission characteristics can be achieved by exposing different regions of the plate (e.g., vertical slices) to different light intensities and then developing the emulsion to produce regions of different optical densities.

The amount of exposure for each region is determined using the $\cos^4$ law. Specifically, a set of points on the screen are selected, e.g., a set of points lying along the horizontal axis of the screen, and the intensity of the blue, green, and red images for each of those points is calculated. The lowest intensity of the three intensities is used as a reference value. For the horizontal red-green-blue system described above, the lowest intensity will be the blue intensity for points to the left of the green system's optical axis and will be the red intensity for points to the right of that axis. At the green system's optical axis, the blue and red intensities are equal and both are smaller than the green intensity, so that they both comprise the reference value.

Using the reference value for each point, the levels of attenuation needed to bring the other two colors down to the reference level are determined. These levels of attenuation are then provided by the filter at the position on the LCD panel which is imaged onto the point on the screen by the lens.

For example, if the red, green, and blue intensities for a particular point along the horizontal axis of the screen are 0.900, 0.973, and 0.999, respectively, the red would be the reference value and the green would need to be attenuated by 8% and the blue by 11%. The part (vertical slice) of the green LCD which is imaged onto the particular point would thus be attenuated by the filter by 8%, and similarly, the part (vertical slice) of the blue LCD which is imaged onto the particular point would be attenuated by the filter by 11%.

Since the parts of the LCD panels which are imaged onto a particular point on the screen are different for the red, green, and blue images, the locations of the attenuation values for each point on the screen will be different on each of the three filters, e.g., the 8% and 11% attenuation values discussed above for the green and blue images will correspond to different vertical slices of their respective filters. In general, when vertical slices are used, the filters for the outboard colors, e.g., the filters for the red and blue images, will be mirror images of each other, while the filter for the central color, e.g., the filter for the green image, will be symmetric about the optical axis of the central lens. If necessary for a particular application, filters having a more complicated spatial distribution than vertical slices can be used, although in general, a one-dimensional correction (e.g., a horizontal correction for horizontally arranged LCD panels) is satisfactory to achieve a color balance on the order of about 2%.

Figure 15:
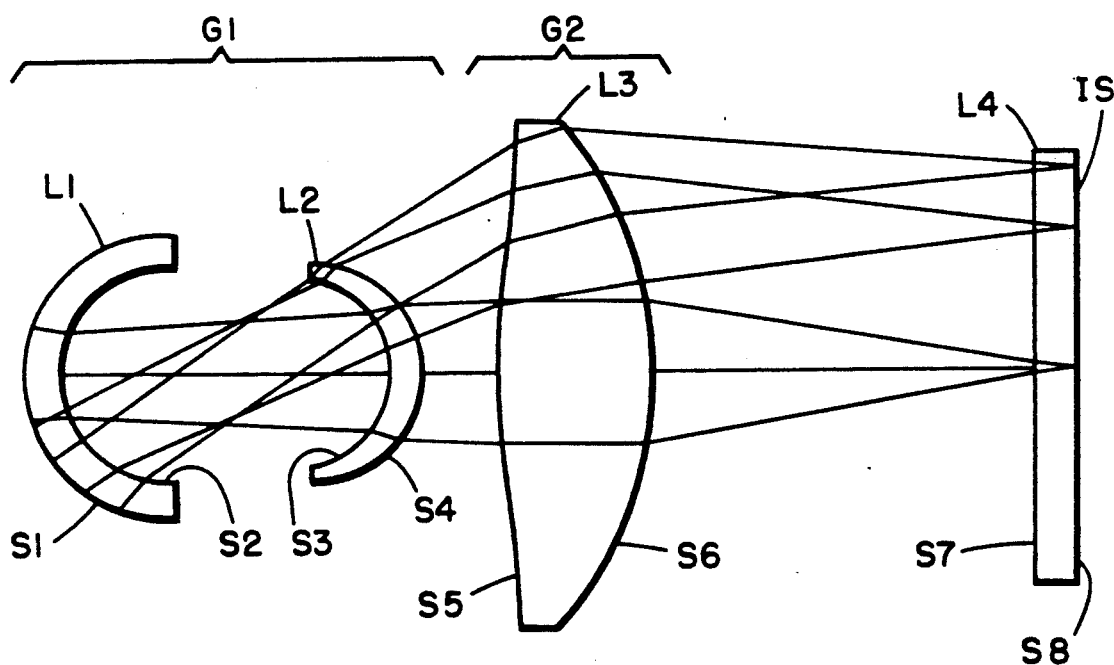

FIG. 15 illustrates the simplest form of a lens system constructed in accordance with the invention. It includes three lenses, with the power lens of the second unit having one aspheric surface and the meniscus lenses of the first unit each having two aspheric surfaces.

Variations of the basic lens system are illustrated in the other figures. In particular, FIGS. 2-4, 6-8 and 11-14 illustrate the addition of one or more lenses having a positive power to the first lens unit, FIGS. 1, 3, 5, 6, and 12-14 illustrate the use of multiple lenses to produce the positive power of the second lens unit, and FIGS. 2-4 and 6-14 show the incorporation of a color correcting doublet in the second lens unit. The additional positive lenses will typically be made of glass, and the color correcting doublet will normally be composed of a crown glass lens and a flint glass lens adjacent to one another or cemented together.

Table 16 summarizes various of the properties and advantages of the present lens system. The focal lengths given in this table are in millimeters. $f_a$ and $f_b$ are the focal lengths of the first and the second meniscus elements (L1 and L2), and $f_m$ is the effective focal length of the combination of these elements. $f_1$ and $f_2$ are the effective focal lengths of the first and second groups (G1 and G2) and EFL is the effective focal length of the lens as a whole. The EXP values represent the distance in millimeters between the exit pupil and the right hand most lens surface in FIGS. 1-15.

As shown in this table, for each lens system, the combined focal length of the two meniscus lenses ($f_m$) is negative and the focal length of the second lens unit ($f_2$) is positive. The lens systems achieve a semi-field of view in the direction of the first lens unit, i.e., to the left in the figures, of at least 30° and in many cases greater than 40°. In terms of speed, all of the lenses have an f-number of at most 3.0 and in many cases as low as 2.0.

Table 17 sets forth the locations relative to the front (left) vertex of the lens system of: 1) surface S2, i.e., the image side of the first meniscus element, 2) the aperture stop, and 3) surface S3, i.e., the object side of the second meniscus element. As shown in this table, for each lens system, the aperture stop lies between the two meniscus lenses.

Although specific embodiments of the invention have been described and illustrated, it is to be understood that a variety of modifications which do not depart from the scope and spirit of the invention will be evident to persons of ordinary skill in the art from the foregoing disclosure. The following claims are intended to cover the specific embodiments set forth herein as well as such modifications, variations, and equivalents.

TABLE 1

| LENS | | SURFACE RADIUS (mm) | AXIAL DISTANCE BETWEEN SURFACES (mm) | Ne | Ve |
|---|---|---|---|---|---|
| L1 | S1 | 17.7759 | | | |
| | | | 9.5508 | 1.49378 | 56.95 |
| | S2 | 12.1386 | | | |
| | | | 19.4432 | | |
| L2 | S3 | −17.5982 | | | |
| | | | 9.5508 | 1.49378 | 56.95 |
| | S4 | −19.4379 | | | |
| | | | 10.0000 | | |
| L3 | S5 | 161.5086 | | | |
| | | | 21.0000 | 1.81100 | 40.10 |
| | S6 | −71.6542 | | | |
| | | | 14.6401 | | |
| L4 | S7 | −570.3546 | | | |
| | | | 12.0000 | 1.49378 | 56.95 |
| | S8 | −66.3227 | | | |
| | | | 32.4526 | | |
| L5 | S9 | ∞ | | | |
| | | | 7.5000 | 1.52458 | 59.20 |
| | S10 | ∞ | | | |
| IS | | | −.0023 | | |

| ASPHERICAL SURFACE DATA: | | | | | | |
|---|---|---|---|---|---|---|
| S | D | E | F | G | H | I |
| S1 | −.45788E-05 | .60309E-08 | −.49866E-09 | .43888E-11 | −.16401E-13 | .20365E-16 |

TABLE 1-continued

| LENS | SURFACE RADIUS (mm) | AXIAL DISTANCE BETWEEN SURFACES (mm) | | | Ne | Ve |
|---|---|---|---|---|---|---|
| S2 | −.22403E-04 | −.60794E-07 | −.10916E-08 | −.68738E-11 | −.36520E-13 | −.34102E-15 |
| S3 | −.97469E-05 | −.13167E-06 | .86263E-09 | .91896E-11 | .20544E-14 | 10921E-15 |
| S4 | −.23516E-05 | −.47123E-07 | .49286E-09 | −.42291E-11 | .15942E-13 | −.26909E-16 |
| S7 | −.14926E-05 | −.86105E-09 | .78499E-14 | .61834E-16 | .12293E-19 | −.37025E-22 |

TABLE 2

| LENS | | SURFACE RADIUS (mm) | AXIAL DISTANCE BETWEEN SURFACES (mm) | Ne | Ve |
|---|---|---|---|---|---|
| L1 | S1 | 28.7823 | | | |
| | | | 8.0000 | 1.49354 | 57.34 |
| | S2 | 15.3391 | | | |
| | | | 16.7622 | | |
| | S3 | −19.2783 | | | |
| L2 | | | 8.0000 | 1.49354 | 57.34 |
| | S4 | −22.0151 | | | |
| | | | .7006 | | |
| | S5 | −278.3887 | | | |
| L3 | | | 12.0000 | 1.79014 | 43.71 |
| | S6 | −36.1020 | | | |
| | | | 5.6780 | | |
| | S7 | −219.4608 | | | |
| L4 | | | 3.0000 | 1.81264 | 25.27 |
| | S8 | 41.9952 | | | |
| L5 | | | 32.8145 | 1.59142 | 61.03 |
| | S9 | −70.2855 | | | |
| | | | 37.5903 | | |
| | S10 | 48.8208 | | | |
| L6 | | | 16.8150 | 1.49354 | 57.34 |
| | S11 | 145.9400 | | | |
| IS | | | 21.3026 | | |

ASPHERICAL SURFACE DATA:

| S | D | E | F | G | H | I |
|---|---|---|---|---|---|---|
| S1 | .91438E-05 | .66971E-07 | .66016E-09 | .46032E-11 | −.14900E-13 | .18800E-16 |
| S2 | .24632E-05 | .34507E-06 | −.24588E-08 | .30071E-11 | .86228E-13 | −.36929E-15 |
| S3 | −.25177E-04 | −.18804E-06 | .29206E-09 | −.64143E-12 | −.36155E-13 | .10792E-15 |
| S4 | −.11031E-04 | −.67063E-07 | .54704E-09 | .46228E-11 | .16128E-13 | −.25696E-16 |
| S10 | −.10937E-05 | −.88407E-09 | .37569E-12 | .25503E-15 | −.48636E-19 | −.58071E-23 |
| S11 | .14726E-05 | −.21298E-08 | .51792E-12 | .00000E+00 | .00000E+00 | .00000E+00 |

TABLE 3

| LENS | | SURFACE RADIUS (mm) | AXIAL DISTANCE BETWEEN SURFACES (mm) | Ne | Ve |
|---|---|---|---|---|---|
| L1 | S1 | 32.8015 | | | |
| | | | 5.5000 | 1.49378 | 56.95 |
| | S2 | 18.8153 | | | |
| | | | 23.1299 | | |
| | S3 | −18.8153 | | | |
| L2 | | | 5.5000 | 1.49378 | 56.95 |
| | S4 | −32.8015 | | | |
| | | | .2000 | | |
| | S5 | −185.2716 | | | |
| L3 | | | 13.0000 | 1.51872 | 64.02 |
| | S6 | −32.2108 | | | |
| | | | 14.8850 | | |
| | S7 | 237.7289 | | | |
| L4 | | | 27.0000 | 1.51872 | 64.02 |
| | S8 | −40.1654 | | | |
| L5 | | | 3.5000 | 1.81264 | 25.27 |
| | S9 | −150.1598 | | | |
| | | | .2000 | | |
| | S11 | 77.1191 | | | |
| L6 | | | 21.0000 | 1.51872 | 64.02 |
| | S11 | ∞ | | | |
| | | | .2000 | | |
| | S12 | 74.9029 | | | |
| L7 | | | 12.0000 | 1.49378 | 56.95 |
| | S13 | −500.0000 | | | |
| | | | 52.5522 | | |
| | S14 | ∞ | | | |
| L8 | | | 7.5000 | 1.52458 | 59.20 |
| | S15 | ∞ | | | |

TABLE 3-continued

| LENS | SURFACE RADIUS (mm) | AXIAL DISTANCE BETWEEN SURFACES (mm) | Ne | Ve |
|---|---|---|---|---|
| IS | | .0071 | | |

ASPHERICAL SURFACE DATA:

| S | D | E | F | G | H | I |
|---|---|---|---|---|---|---|
| S1 | .21254E-04 | .56903E-07 | −.62128E-09 | .45344E-11 | −.14394E-13 | .20260E-16 |
| S2 | .20543E-04 | .18301E-06 | −.11631E-08 | .58893E-11 | .39371E-14 | .27849E-16 |
| S3 | −.20543E-04 | −.18301E-06 | .11631E-08 | −.58893E-11 | −.39371E-14 | −.27849E-16 |
| S4 | −.21254E-04 | −.56903E-07 | .62128E-09 | −.45344E-11 | .14394E-13 | −.20260E-16 |
| S12 | −.25664E-05 | .22422E-09 | −.12244E-12 | .10463E-16 | .18431E-19 | −.42650E-23 |

TABLE 4

| LENS | | SURFACE RADIUS (mm) | AXIAL DISTANCE BETWEEN SURFACES (mm) | Ne | Ve |
|---|---|---|---|---|---|
| L1 | S1 | 22.6738 | | | |
|  |  |  | 6.0000 | 1.49354 | 57.34 |
|  | S2 | 14.4544 | | | |
|  |  |  | 11.4814 | | |
|  | S3 | −14.4544 | | | |
| L2 |  |  | 6.0000 | 1.49354 | 57.34 |
|  | S4 | −22.6738 | | | |
|  |  |  | .5000 | | |
|  | S5 | −43.2373 | | | |
| L3 |  |  | 5.0000 | 1.74795 | 44.50 |
|  | S6 | −30.2256 | | | |
|  |  |  | .2000 | | |
|  | S7 | ∞ | | | |
| L4 |  |  | 6.0000 | 1.74795 | 44.50 |
|  | S8 | −51.6464 | | | |
|  |  |  | 10.5351 | | |
|  | S9 | −575.6311 | | | |
| L5 |  |  | 2.0000 | 1.81265 | 25.24 |
|  | S10 | 32.7772 | | | |
| L6 |  |  | 23.5201 | 1.51872 | 63.98 |
|  | S11 | −41.7643 | | | |
|  |  |  | .2000 | | |
|  | S12 | 43.4795 | | | |
| L7 |  |  | 13.5000 | 1.49354 | 57.34 |
|  | S13 | 4001.6410 | | | |
|  |  |  | 28.1660 | | |
|  | S14 | ∞ | | | |
| L8 |  |  | 7.5000 | 1.52458 | 59.20 |
|  | S15 | ∞ | | | |
| IS |  |  | .0144 | | |

ASPHERICAL SURFACE DATA:

| S | D | E | F | G | H | I |
|---|---|---|---|---|---|---|
| S1 | .49155E-04 | .22463E-06 | −.57949E-08 | .99282E-10 | −.68862E-12 | .19504E-14 |
| S2 | .65098E-04 | .56798E-06 | .44600E-08 | −.13934E-09 | .16961E-11 | .16243E-14 |
| S3 | −.65098E-04 | −.56798E-06 | −.44600E-08 | .13934E-09 | −.16961E-11 | −.16243E-14 |
| S4 | −.49155E-04 | −.22463E-06 | .57949E-08 | −.99282E-10 | .68862E-12 | .19504E-14 |
| S12 | −.23027E-05 | −.15752E-08 | −.66567E-12 | −.90928E-14 | .17995E-16 | −.53345E-20 |
| S13 | .18696E-05 | −.52905E-08 | −.44993E-12 | .40746E-15 | .18960E-17 | .38670E-20 |

TABLE 5

| LENS | | SURFACE RADIUS (mm) | AXIAL DISTANCE BETWEEN SURFACES (mm) | Ne | Ve |
|---|---|---|---|---|---|
| L1 | S1 | 17.3785 | | | |
|  |  |  | 9.5508 | 1.49378 | 56.95 |
|  | S2 | 12.9715 | | | |
|  |  |  | 20.7752 | | |
|  | S3 | −14.7852 | | | |
| L2 |  |  | 9.5508 | 1.49378 | 56.95 |
|  | S4 | −29.1575 | | | |
|  |  |  | 2.0000 | | |
|  | S5 | 161.6440 | | | |
| L3 |  |  | 21.0000 | 1.81100 | 40.10 |
|  | S6 | −70.8570 | | | |
|  |  |  | 14.6467 | | |
|  | S7 | 226.3368 | | | |
| L4 |  |  | 12.0000 | 1.49378 | 56.95 |
|  | S8 | −70.4748 | | | |

TABLE 5-continued

|  |  |  |  | 30.5420 |  |  |
|---|---|---|---|---|---|---|
|  | S9 | ∞ |  |  |  |  |
| L5 |  |  |  | 7.5000 | 1.52458 | 59.20 |
|  | S10 | ∞ |  |  |  |  |
| IS |  |  |  | .0001 |  |  |

ASPHERICAL SURFACE DATA:

| S | D | E | F | G | H | I |
|---|---|---|---|---|---|---|
| S1 | −.34319E-06 | −.17626E-08 | −.46642E-09 | .45028E-11 | −.16393E-13 | .18773E-16 |
| S2 | −.76937E-05 | −.28057E-07 | −.91300E-09 | .95135E-11 | −.15166E-13 | −.31014E-15 |
| S3 | −.74018E-05 | −.97035E-07 | .63968E-09 | −.11683E-10 | −.68868E-14 | .22915E-15 |
| S4 | −.39284E-05 | −.30285E-07 | .47568E-09 | −.44044E-11 | .15896E-13 | −.24403E-16 |
| S7 | −.17259E-05 | −.78470E-09 | .10852E-12 | .10731E-15 | .12067E-19 | −.57939E-22 |

TABLE 6

| LENS |  | SURFACE RADIUS (mm) | AXIAL DISTANCE BETWEEN SURFACES (mm) | Ne | Ve |
|---|---|---|---|---|---|
|  | S1 | 23.7376 |  |  |  |
| L1 |  |  | 5.500 | 1.49378 | 56.95 |
|  | S2 | 16.4354 |  |  |  |
|  |  |  | 23.1360 |  |  |
|  | S3 | −16.4354 |  |  |  |
| L2 |  |  | 5.5000 | 1.49378 | 56.95 |
|  | S4 | −23.7376 |  |  |  |
|  |  |  | .7000 |  |  |
|  | S5 | 149.1692 |  |  |  |
| L3 |  |  | 9.8000 | 1.81080 | 40.40 |
|  | S6 | −58.3276 |  |  |  |
|  |  |  | 10.2857 |  |  |
|  | S7 | −94.3722 |  |  |  |
| L4 |  |  | 2.800 | 1.81264 | 25.27 |
|  | S8 | 47.5779 |  |  |  |
| L5 |  |  | 27.9659 | 1.51872 | 64.02 |
|  | S9 | −68.9731 |  |  |  |
|  |  |  | .2800 |  |  |
|  | S10 | 103.6153 |  |  |  |
| L6 |  |  | 15.0000 | 1.64128 | 55.19 |
|  | S11 | −1178.8950 |  |  |  |
|  |  |  | .2800 |  |  |
|  | S12 | 67.1063 |  |  |  |
| L7 |  |  | 16.0000 | 1.49378 | 56.95 |
|  | S13 | ∞ |  |  |  |
|  |  |  | 44.2202 |  |  |
|  | S14 | ∞ |  |  |  |
| L8 |  |  | 7.5000 | 1.52458 | 59.20 |
|  | S15 | ∞ |  |  |  |
| IS |  |  | .0007 |  |  |

ASPHERICAL SURFACE DATA:

| S | D | E | F | G | H | I |
|---|---|---|---|---|---|---|
| S1 | .12278E-04 | .59689E-07 | −.60642E-09 | .45981E-11 | −.15098E-13 | .22978E-16 |
| S2 | .72983E-05 | .15581E-06 | −.15411E-08 | .62181E-11 | .26556E-13 | −.11399E-15 |
| S3 | −.72983E-05 | −.15581E-06 | .15411E-08 | −.62181E-11 | −.26556E-13 | .11399E-15 |
| S4 | −.12278E-04 | −.59689E-07 | .60642E-09 | −.45981E-11 | .15098E-13 | −.22978E-16 |
| S12 | −.18416E-05 | .18305E-09 | −.89895E-13 | .11557E-16 | .76324E-20 | −.13759E-23 |

TABLE 7

| LENS |  | SURFACE RADIUS (mm) | AXIAL DISTANCE BETWEEN SURFACES (mm) | Ne | Ve |
|---|---|---|---|---|---|
|  | S1 | 18.2577 |  |  |  |
| L1 |  |  | 5.000 | 1.49354 | 57.34 |
|  | S2 | 12.5376 |  |  |  |
|  |  |  | 16.2547 |  |  |
|  | S3 | −12.5376 |  |  |  |
| L2 |  |  | 5.0000 | 1.49354 | 57.34 |
|  | S4 | −18.2577 |  |  |  |
|  |  |  | .5000 |  |  |
|  | S5 | −127.0900 |  |  |  |
| L3 |  |  | 7.0000 | 1.68081 | 55.29 |
|  | S6 | −31.8976 |  |  |  |
|  |  |  | 12.9715 |  |  |
|  | S7 | 83.6127 |  |  |  |
| L4 |  |  | 2.0000 | 1.81264 | 25.27 |
|  | S8 | 29.8873 |  |  |  |
| L5 |  |  | 20.0000 | 1.69660 | 53.04 |

TABLE 7-continued

| | | | | | | |
|---|---|---|---|---|---|---|
| | S9 | −97.2503 | | | | |
| | | | 14.3655 | | | |
| | S10 | 28.8041 | | | | |
| L6 | | | 10.0000 | | 1.49354 | 57.34 |
| | S11 | 52.9289 | | | | |
| | | | 18.0283 | | | |
| | S12 | ∞ | | | | |
| L7 | | | 5.0000 | | 1.52458 | 59.20 |
| | S13 | ∞ | | | | |
| IS | | | .1794 | | | |

ASPHERICAL SURFACE DATA:

| S | D | E | F | G | H | I |
|---|---|---|---|---|---|---|
| S1 | .24252E-04 | .23179E-06 | −.57427E-08 | .94245E-10 | −.63380E-12 | .16910E-14 |
| S2 | .17694E-04 | .71347E-07 | .48122E-08 | .47030E-10 | −.17779E-11 | .14207E-13 |
| S3 | −.17694E-04 | −.71347E-07 | −.48122E-08 | −.47030E-10 | .17779E-11 | −.14207E-13 |
| S4 | −.24252E-04 | −.23179E-06 | .57427E-08 | −.94245E-10 | .63380E-12 | −.16910E-14 |
| S10 | −.57691E-05 | .28971E-08 | −.29776E-10 | −.37266E-15 | .11129E-16 | .36784E-20 |
| S11 | .93177E-05 | −.24644E-07 | .14005E-10 | −.19233E-13 | −.20640E-16 | .58652E-19 |

TABLE 8

| LENS | | SURFACE RADIUS (mm) | AXIAL DISTANCE BETWEEN SURFACES (mm) | Ne | Ve |
|---|---|---|---|---|---|
| | S1 | 30.5354 | | | |
| L1 | | | 7.0000 | 1.49354 | 57.34 |
| | S2 | 16.2348 | | | |
| | | | 10.9709 | | |
| | S3 | −13.2430 | | | |
| L2 | | | 7.0000 | 1.49354 | 57.34 |
| | S4 | −20.7350 | | | |
| | | | .5000 | | |
| | S5 | −264.5262 | | | |
| L3 | | | 7.0000 | 1.79014 | 43.71 |
| | S6 | −28.3891 | | | |
| | | | 5.1530 | | |
| | S7 | −2892.4940 | | | |
| L4 | | | 18.0000 | 1.59142 | 61.03 |
| | S8 | −21.8366 | | | |
| L5 | | | 2.0000 | 1.81264 | 25.27 |
| | S9 | −150.0730 | | | |
| | | | 11.8696 | | |
| | S10 | 40.1802 | | | |
| L6 | | | 16.0000 | 1.49354 | 57.34 |
| | S11 | −60.3706 | | | |
| IS | | | 29.4427 | | |

ASPHERICAL SURFACE DATA:

| S | D | E | F | G | H | I |
|---|---|---|---|---|---|---|
| S1 | .52425E-04 | .26497E-06 | −.73671E-08 | .10326E-09 | −.60311E-12 | .13583E-14 |
| S2 | .74007E-04 | .11730E-05 | −.50579E-09 | −.32124E-10 | −.36390E-12 | .14851E-13 |
| S3 | −.61098E-04 | .44763E-06 | −.13943E-07 | .13806E-11 | .16313E-11 | −.21280E-13 |
| S4 | −.32058E-04 | −.28361E-06 | .69455E-08 | −.10114E-09 | .62754E-12 | −.15880E-14 |
| S10 | −.49600E-05 | −.33580E-09 | −.38429E-11 | .92244E-14 | −.36573E-17 | −.59097E-20 |
| S11 | .61384E-05 | −.70862E-08 | .25922E-11 | .28554E-14 | .37778E-17 | −.94612E-20 |

TABLE 9

| LENS | | SURFACE RADIUS (mm) | AXIAL DISTANCE BETWEEN SURFACES (mm) | Ne | Ve |
|---|---|---|---|---|---|
| | S1 | 22.3688 | | | |
| L1 | | | 7.0000 | 1.49354 | 57.34 |
| | S2 | 19.2931 | | | |
| | | | 6.3890 | | |
| | S3 | −19.2931 | | | |
| L2 | | | 7.0000 | 1.49354 | 57.34 |
| | S4 | −22.3688 | | | |
| | | | 4.2083 | | |
| | S5 | −30.6876 | | | |
| L3 | | | 2.0000 | 1.73432 | 28.11 |
| | S6 | 41.8645 | | | |
| L4 | | | 16.0000 | 1.59142 | 61.03 |
| | S7 | −22.4910 | | | |
| | | | .2000 | | |
| | S8 | 43.4151 | | | |
| L5 | | | 15.0000 | 1.49354 | 57.34 |
| | S9 | −54.7325 | | | |

TABLE 9-continued

| IS | | | 36.3263 | | |
|---|---|---|---|---|---|

ASPHERICAL SURFACE DATA:

| S | D | E | F | G | H | I |
|---|---|---|---|---|---|---|
| S1 | .95049E-04 | −.60329E-06 | .71036E-08 | .73940E-10 | −.14417E-11 | .71150E-14 |
| S2 | .11952E-03 | .65573E-06 | −.23267E-07 | .15254E-08 | −.31105E-10 | .25483E-12 |
| S3 | −.11952E-03 | −.65573E-06 | .23267E-07 | −.15254E-08 | .31105E-10 | −.25483E-12 |
| S4 | −.95049E-04 | .60329E-06 | −.71036E-08 | −.73940E-10 | .14417E-11 | −.71150E-14 |
| S8 | −.82733E-05 | .20516E-08 | .13076E-10 | −.32641E-13 | .27708E-16 | −.56395E-20 |

TABLE 10

| LENS | | SURFACE RADIUS (mm) | AXIAL DISTANCE BETWEEN SURFACES (mm) | Ne | Ve |
|---|---|---|---|---|---|
| L1 | S1 | 20.8037 | | | |
| | | | 7.0000 | 1.49354 | 57.34 |
| | S2 | 15.6695 | | | |
| | | | 9.7917 | | |
| L2 | S3 | −15.6695 | | | |
| | | | 7.0000 | 1.49354 | 57.34 |
| | S4 | −20.8037 | | | |
| | | | 4.1854 | | |
| L3 | S5 | −58.7254 | | | |
| | | | 2.000 | 1.81265 | 25.24 |
| | S6 | 45.6125 | | | |
| L4 | | | 19.0000 | 1.59142 | 61.04 |
| | S7 | −26.2048 | | | |
| | | | .2000 | | |
| L5 | S8 | 55.4480 | | | |
| | | | 15.0000 | 1.49354 | 57.34 |
| | S9 | −62.0211 | | | |
| IS | | | 46.7889 | | |

ASPHERICAL SURFACE DATA:

| S | D | E | F | G | H | I |
|---|---|---|---|---|---|---|
| S1 | .59784E-04 | .95956E-07 | −.24429E-08 | .75904E-10 | −.68347E-12 | .26622E-14 |
| S2 | .95620E-04 | .92168E-06 | −.15033E-07 | .38714E-09 | −.35523E-11 | .39766E-13 |
| S3 | −.95620E-04 | −.92168E-06 | .15033E-07 | −.38714E-09 | .35523E-11 | −.39766E-13 |
| S4 | −.59784E-04 | −.95956E-07 | .24429E-08 | −.75904E-10 | .68347E-12 | −.26622E-14 |
| S8 | −.46541E-05 | −.36875E-09 | .12314E-10 | −.28312E-13 | .30082E-16 | −.12218E-19 |

TABLE 11

| LENS | | SURFACE RADIUS (mm) | AXIAL DISTANCE BETWEEN SURFACES (mm) | Ne | Ve |
|---|---|---|---|---|---|
| L1 | S1 | 19.6797 | | | |
| | | | 7.0000 | 1.49354 | 57.34 |
| | S2 | 12.7917 | | | |
| | | | 9.9879 | | |
| L2 | S3 | −12.7917 | | | |
| | | | 7.0000 | 1.49354 | 57.34 |
| | S4 | −19.6797 | | | |
| | | | .5000 | | |
| L3 | S5 | −140.8208 | | | |
| | | | 6.0000 | 1.74795 | 44.50 |
| | S6 | −30.3776 | | | |
| | | | 10.2111 | | |
| L4 | S7 | −353.9825 | | | |
| | | | 2.000 | 1.81265 | 25.24 |
| | S8 | 34.1227 | | | |
| L5 | | | 19.0000 | 1.51872 | 63.98 |
| | S9 | −44.2173 | | | |
| | | | .2000 | | |
| L6 | S10 | 52.4065 | | | |
| | | | 14.0000 | 1.49354 | 57.34 |
| | S11 | −75.7172 | | | |
| IS | | | 37.0320 | | |

ASPHERICAL SURFACE DATA:

| S | D | E | F | G | H | I |
|---|---|---|---|---|---|---|
| S1 | .46425E-04 | .11426E-06 | −.34005E-08 | .95787E-10 | −.82815E-12 | .28090E-14 |
| S2 | .45128E-04 | .22813E-06 | −.36849E-07 | .10980E-09 | .96187E-11 | −.75740E-13 |
| S3 | −.45128E-04 | −.22913E-06 | .36849E-07 | −.10980E-09 | −.96187E-11 | .77540E-13 |
| S4 | −.46425E-04 | −.11426E-06 | .34005E-08 | −.95787E-10 | .82815E-12 | −.28090E-14 |
| S10 | −.47487E-05 | .42760E-08 | −.53235E-12 | −.11185E-13 | .19094E-16 | −.96500E-20 |

TABLE 12

| LENS | | SURFACE RADIUS (mm) | AXIAL DISTANCE BETWEEN SURFACES (mm) | Ne | Ve |
|---|---|---|---|---|---|
| L1 | S1 | 31.5510 | | | |
| | | | 5.5000 | 1.49354 | 57.34 |
| | S2 | 17.4872 | | | |
| | | | 35.7001 | | |
| L2 | S3 | −23.4278 | | | |
| | | | 5.5000 | 1.49354 | 57.34 |
| | S4 | −34.1799 | | | |
| | | | .2000 | | |
| L3 | S5 | −3692.6330 | | | |
| | | | 14.0000 | 1.59142 | 61.04 |
| | S6 | −45.1257 | | | |
| | | | 21.4848 | | |
| L4 | S7 | 120.8268 | | | |
| | | | 28.0000 | 1.59142 | 61.04 |
| | S8 | −51.8789 | | | |
| L5 | | | 3.5000 | 1.81265 | 25.24 |
| | S9 | 1243.3220 | | | |
| | | | .2000 | | |
| L6 | S10 | 85.8452 | | | |
| | | | 8.0000 | 1.49354 | 57.34 |
| | S11 | 994.1133 | | | |
| | | | .2000 | | |
| L7 | S12 | 91.1670 | | | |
| | | | 19.0000 | 1.59142 | 61.04 |
| | S13 | −700.0000 | | | |
| | | | 47.4133 | | |
| L8 | S14 | ∞ | | | |
| | | | 7.5000 | 1.52458 | 59.20 |
| | S15 | ∞ | | | |
| | | | −.2186 | | |

ASPHERICAL SURFACE DATA:

| S | D | E | F | G | H | I |
|---|---|---|---|---|---|---|
| S1 | .64634E-05 | .47695E-07 | .46866E-09 | .21849E-11 | −.44650E-14 | .34118E-17 |
| S2 | .15629E-04 | −.12940E-06 | −.27540E-09 | .10827E-10 | −.52229E-13 | .73752E-16 |
| S3 | −.89157E-05 | −.32675E-08 | −.43270E-09 | .25434E-11 | −.74108E-14 | .57722E-17 |
| S4 | −.13761E-04 | .32223E-07 | −.28187E-09 | −.88409E-12 | −.14240E-14 | .68811E-18 |
| S10 | −.19635E-05 | .47273E-09 | .191325E-12 | −.37657E-15 | .20398E-18 | −.38569E-22 |
| S11 | .85510E-06 | .86817E-10 | −.59245E-14 | .25410E-17 | −.95451E-21 | −.133£1E-23 |

TABLE 13

| LENS | | SURFACE RADIUS (mm) | AXIAL DISTANCE BETWEEN SURFACES (mm) | Ne | Ve |
|---|---|---|---|---|---|
| L1 | S1 | 29.9168 | | | |
| | | | 5.5000 | 1.49378 | 56.95 |
| | S2 | 15.6657 | | | |
| | | | 31.5808 | | |
| L2 | S3 | −18.4427 | | | |
| | | | 5.5000 | 1.49378 | 56.95 |
| | S4 | −22.1700 | | | |
| | | | .2000 | | |
| L3 | S5 | −4383.6960 | | | |
| | | | 13.0000 | 1.51872 | 64.02 |
| | S6 | −30.4903 | | | |
| | | | 16.1968 | | |
| L4 | S7 | 366.0689 | | | |
| | | | 27.0000 | 1.51872 | 64.02 |
| | S8 | −39.5008 | | | |
| L5 | | | 3.5000 | 1.81264 | 25.27 |
| | S9 | −417.0970 | | | |
| | | | .2000 | | |
| L6 | S10 | 60.7265 | | | |
| | | | 11.0000 | 1.51872 | 64.02 |
| | S11 | 103.6803 | | | |
| | | | 3.5000 | | |
| L7 | S12 | 77.5843 | | | |
| | | | 10.0000 | 1.49378 | 56.95 |
| | S13 | −500.0000 | | | |
| | | | 37.9922 | | |
| L8 | S14 | ∞ | | | |
| | | | 7.5000 | 1.52458 | 59.20 |
| | S15 | ∞ | | | |
| | | | .0062 | | |

ASPHERICAL SURFACE DATA:

TABLE 13-continued

| S | D | E | F | G | H | I |
|---|---|---|---|---|---|---|
| S1 | −.11652E-05 | .16477E-06 | −.11785E-08 | .46238E-11 | −.89805E-14 | .72400E-17 |
| S2 | −.31867E-05 | .22815E-06 | −.36980E-08 | .30597E-10 | −.12642E-12 | .21285E-15 |
| S3 | .10187E-04 | −.55900E-06 | .70504E-08 | −.56198E-10 | .22650E-12 | −.36485E-15 |
| S4 | −.14590E-05 | −.65322E-07 | .39611E-09 | −.17857E-11 | .36369D-14 | −.60169E-18 |
| S12 | −.32759E-05 | .41121E-09 | −.41352E-12 | .26198E-15 | −.84179E-19 | .17419E-22 |

TABLE 14

| LENS | | SURFACE RADIUS (mm) | AXIAL DISTANCE BETWEEN SURFACES (mm) | Ne | Ve |
|---|---|---|---|---|---|
| L1 | S1 | 52.2005 | | | |
|  |  |  | 10.6801 | 1.49378 | 56.95 |
|  | S2 | 35.5523 | | | |
|  |  |  | 62.9044 | | |
| L2 | S3 | −38.7611 | | | |
|  |  |  | 10.6801 | 1.49378 | 56.95 |
|  | S4 | −98.3762 | | | |
|  |  |  | .3884 | | |
| L3 | S5 | −396.1563 | | | |
|  |  |  | 25.2440 | 1.74794 | 44.62 |
|  | S6 | −90.5061 | | | |
|  |  |  | 25.5692 | | |
| L4 | S7 | 536.9179 | | | |
|  |  |  | 10.0000 | 1.49354 | 57.34 |
|  | S8 | −950.0001 | | | |
|  |  |  | .2000 | | |
| L5 | S9 | 326.7201 | | | |
|  |  |  | 37.0000 | 1.59142 | 61.03 |
|  | S10 | −105.1547 | | | |
|  |  |  | 6.7495 | | |
| L6 | S11 | −122.8178 | | | |
|  |  |  | 6.7965 | 1.81264 | 25.27 |
|  | S12 | 239.3103 | | | |
|  |  |  | 6.0000 | | |
| L7 | S13 | 191.4108 | | | |
|  |  |  | 26.0000 | 1.49354 | 57.34 |
|  | S14 | −121.3245 | | | |
|  |  |  | .3884 | | |
| L8 | S15 | 126.8307 | | | |
|  |  |  | 25.0000 | 1.59142 | 61.03 |
|  | S16 | 281.5348 | | | |
|  |  |  | 106.6943 | | |
| L9 | S17 | ∞ | | | |
|  |  |  | 7.5000 | 1.52458 | 59.20 |
|  | S18 | ∞ | | | |
|  |  |  | −.0003 | | |

ASPHERICAL SURFACE DATA:

| S | D | E | F | G | H | I |
|---|---|---|---|---|---|---|
| S1 | −.98921E-06 | .60469E-08 | −.11276E-10 | .12327E-13 | −.67167E-17 | .14738E-20 |
| S2 | −.25012E-05 | .13191E-07 | −.38935E-10 | .64219E-13 | −.52841E-16 | .16907E-19 |
| S3 | .10921E-05 | −.78222E-08 | .48498E-10 | −.13111E-12 | .16240E-15 | −.78590E-19 |
| S4 | .13591E-06 | .31442E-09 | .78053E-13 | −.15857E-14 | .16211E-17 | −.52465E-21 |
| S7 | .24968E-06 | −.54598E-10 | −.12156E-14 | −.15055E-17 | .76310E-21 | −.11056E-24 |
| S13 | −.47229E-06 | .29940E-10 | −.98805E-15 | .81948E-21 | −.83944E-22 | .22156E-25 |

TABLE 15

| LENS | | SURFACE RADIUS (mm) | AXIAL DISTANCE BETWEEN SURFACES (mm) | Ne | Ve |
|---|---|---|---|---|---|
| L1 | S1 | 28.2062 | | | |
|  |  |  | 5.5000 | 1.49378 | 56.95 |
|  | S2 | 20.3715 | | | |
|  |  |  | 57.0713 | | |
| L2 | S3 | −17.0763 | | | |
|  |  |  | 5.5000 | 1.49378 | 56.95 |
|  | S4 | −19.1565 | | | |
|  |  |  | 13.2978 | | |
| L3 | S5 | 147.0498 | | | |
|  |  |  | 25.0000 | 1.83930 | 37.05 |
|  | S6 | −68.6781 | | | |
|  |  |  | 66.1807 | | |
| L4 | S7 | ∞ | | | |
|  |  |  | 7.5000 | 1.52458 | 59.20 |
|  | S8 | ∞ | | | |

TABLE 15-continued

| | | | −.0535 | | |
|---|---|---|---|---|---|

ASPHERICAL SURFACE DATA:

| S | D | E | F | G | H | I |
|---|---|---|---|---|---|---|
| S1 | .19714E-05 | .12362E-06 | −.13554E-08 | .56254E-11 | −.10240E-13 | .70558E-17 |
| S2 | .45123E-05 | .20830E-06 | −.45701E-08 | .30666E-10 | −.87266E-13 | .92155E-16 |
| S3 | .97013E-05 | −.41735E-06 | .47807E-08 | −.31622E-10 | .10137E-12 | −.13253E-15 |
| S4 | −.30672E-05 | −.12914E-06 | .13700E-08 | −.76464E-11 | .19872E-13 | −.21095E-16 |
| S5 | −.31484E-05 | .33506E-08 | −.28481E-11 | .14208E-14 | −.35832E-18 | .31941E-22 |

TABLE 16

| Example | $f_a$ | $f_b$ | $f_m$ | $f_1$ | $f_2$ | EFL | Mag. | EXP | ½ Field of View | f/No. |
|---|---|---|---|---|---|---|---|---|---|---|
| 1 | −176.2 | 525.9 | −335.6 | −335.6 | 51.4 | 48.2 | .0000E+00 | −9262 | 40.0° | 3.00 |
| 2 | −82.8 | −9230.5 | −93.1 | 59.5 | 107.9 | 49.2 | −.4673E-01 | −4981 | 40.8° | 3.00 |
| 3 | −102.7 | −102.7 | −48.6 | 2760.9 | 74.4 | 48.2 | −.4673E-01 | −5772 | 41.3° | 3.00 |
| 4 | −106.5 | −106.5 | −55.1 | 76.7 | 58.5 | 35.0 | −.3985E-01 | 17371 | 34.3° | 2.00 |
| 5 | −365.2 | −472.1 | −241.5 | −241.5 | 46.8 | 48.2 | .0000E+00 | −5353 | 40.0° | 3.00 |
| 6 | −144.1 | −144.1 | −71.8 | 94.6 | 78.4 | 49.1 | −.4673E-01 | −7203 | 40.9° | 3.00 |
| 7 | −114.0 | −114.0 | −58.1 | 219.6 | 50.4 | 35.1 | −.3985E-01 | 1713 | 34.2° | 2.00 |
| 8 | −83.8 | −107.4 | −49.0 | 68.2 | 61.3 | 35.0 | −.3192E-01 | 8280 | .34.6° | 2.00 |
| 9 | −1146.8 | −1146.8 | −637.6 | −637.6 | 31.8 | 31.8 | −.2857E-01 | −18117 | 34.2° | 2.00 |
| 10 | −234.1 | −234.1 | −128.7 | −128.7 | 35.1 | 35.1 | −.3192E-01 | 11267 | 34.5° | 2.50 |
| 11 | −111.5 | −111.5 | −60.1 | 118.4 | 50.6 | 35.1 | −.3985E-01 | 636477 | 34.5° | 2.50 |
| 12 | −91.3 | −181.6 | −56.6 | 283.7 | 86.6 | 48.0 | −.4673E-01 | −18645 | 41.5° | 3.00 |
| 13 | −76.3 | −433.7 | −66.0 | 76.6 | 148.7 | 48.6 | −.4673E-01 | −234 | 40.8° | 3.00 |
| 14 | −286.5 | −137.7 | −85.2 | −543.7 | 129.5 | 93.6 | −.2941E.01 | 973978 | 31.4° | 3.00 |
| 15 | −193.4 | −2527.6 | −193.6 | −193.6 | 58.9 | 49.3 | −.4673E-01 | −7743 | 35.4° | 3.00 |

TABLE 17

| Example | S2 (mm) | A (mm) | S3 (mm) |
|---|---|---|---|
| 1 | 9.55 | 18.21 | 28.99 |
| 2 | 8.00 | 16.50 | 24.76 |
| 3 | 5.50 | 17.48 | 28.63 |
| 4 | 6.00 | 13.61 | 17.48 |
| 5 | 9.55 | 17.39 | 30.33 |
| 6 | 5.50 | 19.96 | 28.64 |
| 7 | 5.00 | 13.10 | 21.25 |
| 8 | 7.00 | 13.77 | 17.97 |
| 9 | 7.00 | 10.17 | 13.39 |
| 10 | 7.00 | 11.88 | 16.79 |
| 11 | 7.00 | 13.48 | 16.99 |
| 12 | 5.50 | 25.40 | 41.20 |
| 13 | 5.50 | 25.93 | 37.08 |
| 14 | 10.68 | 53.90 | 73.58 |
| 15 | 5.50 | 31.13 | 62.57 |

What is claimed is:

1. A lens system which includes an aperture stop and which comprises:
   (a) a first lens unit which comprises two meniscus element whose concave surfaces face each other and whose combined optical power is negative, the system's aperture stop being located between the two meniscus elements; and
   (b) a second lens unit which has a positive power, said lens system including at least one aspheric lens surface.

2. The lens system of claim 1 wherein correction of the Petzval curvature of the lens system is provided primarily by the first lens unit.

3. The lens system of claim 1 wherein said at least one aspheric lens surface comprises at least one aspheric lens surface in the first lens unit which provides substantial correction of aperture dependent aberrations.

4. The lens system of claim 1 wherein the first lens unit includes at least one element in addition to the meniscus elements, said element having a positive power.

5. The lens system of claim 1 wherein the two meniscus elements of the first lens unit are identical.

6. The lens system of claim 1 wherein the second lens unit includes a color-correcting doublet.

7. The lens system of claim 1 wherein the power of the first lens unit is less than the power of the second lens unit.

8. The lens system of claim 1 wherein the f-number of the system is about 3.0 or less.

9. A telecentric lens system which includes an aperture stop and a telecentric pupil, said system comprising:
   (a) a first lens unit which comprises two meniscus elements whose concave surfaces face each other; and
   (b) a second lens unit which has a positive power and which forms the telecentric pupil by imaging the aperture stop,
   said lens system including at least one aspheric lens surface.

10. The telecentric lens system of claim 9 wherein the system's aperture stop is located between the two meniscus elements.

11. The telecentric lens system of claim 9 wherein correction of the Petzval curvature of the lens system is provided primarily by the first lens unit.

12. The telecentric lens system of claim 9 wherein said at least one aspheric lens surface comprises at least one aspheric lens surface in the first lens unit which provides substantial correction of aperture dependent aberrations.

13. The telecentric lens system of claim 9 wherein the first lens unit includes at least one element in addition to the meniscus elements, said element having a positive power.

14. The telecentric lens system of claim 9 wherein the two meniscus elements of the first lens unit are identical.

15. The telecentric lens system of claim 9 wherein said at least one aspheric lens surface comprises at least one aspheric lens surface in the second lens unit which provides substantial correction for spherical aberrations in the imaging of the aperture stop to form the telecentric pupil.

16. The telecentric lens system of claim 9 wherein the second lens unit includes a color-correcting doublet.

17. The telecentric lens system of claim 9 wherein the combined power of the two meniscus elements is negative.

18. The telecentric lens system of claim 9 wherein the power of the first lens unit is less than the power of the second lens unit.

19. The telecentric lens system of claim 9 wherein the f-number of the system is about 3.0 or less.

20. A wide angle lens system which includes an aperture stop and which comprises:
(a) a first lens unit which comprises two meniscus elements whose concave surfaces face each other, the system's aperture stop being located between the two meniscus elements; and
(b) a second lens unit which has a positive power; said lens system including at least one aspheric lens surface and having a half angle field of view in the direction of the first lens unit of at least about 20 degrees.

21. The wide angle lens system of claim 20 wherein the lens system has a half angle field of view in the direction of the first lens unit of at least about 30 degrees.

22. The wide angle lens system of claim 20 wherein correction of the Petzval curvature of the lens system is provided primarily by the first lens unit.

23. The wide angle lens system of claim 20 wherein said at least one aspheric lens surface comprises at least one aspheric lens surface in the first lens unit which provides substantial correction of aperture dependent aberrations.

24. The wide angle lens system of claim 20 wherein the first lens unit includes at least one element in addition to the meniscus elements, said element having a positive power.

25. The wide angle lens system of claim 20 wherein the two meniscus elements of the first lens unit are identical.

26. The wide angle lens system of claim 20 wherein the second lens unit includes a color-correcting doublet.

27. The wide angle lens system of claim 20 wherein the combined power of the two meniscus elements is negative.

28. The wide angle lens system of claim 20 wherein the power of the first lens unit is less than the power of the second lens unit.

29. The wide angle lens system of claim 20 wherein the f-number of the system is about 3.0 or less.

30. A lens system which includes an aperture stop and which comprises:
(a) a first lens unit which comprises two meniscus elements whose concave surfaces face each other and whose combined optical power is negative, the system's aperture stop being located between the two meniscus elements and each of said meniscus elements having a weak optical power whose absolute value is less than the absolute value of the optical power of the lens system; and
(b) a second lens unit which has a positive power.

31. The lens system of claim 30 wherein the system includes at least one aspheric lens surface.

32. The lens system of claim 30 wherein the first lens unit includes at least one element in addition to the meniscus elements, said element having a positive power.

33. The lens system of claim 30 wherein the two meniscus elements of the first lens unit are identical.

34. The lens system of claim 30 wherein the second lens unit includes a color-correcting doublet.

35. A telecentric lens system which includes an aperture stop and a telecentric pupil, said system comprising:
(a) a first lens unit which comprises two meniscus elements whose concave surfaces face each other, each of said meniscus elements having a weak optical power whose absolute value is less than the absolute value of the optical power of the lens system; and
(b) a second lens unit which has a positive power and which forms the telecentric pupil by imaging the aperture stop.

36. The telecentric lens system of claim 35 wherein the system includes at least one aspheric lens surface.

37. The telecentric lens system of claim 35 wherein the system's aperture stop is located between the two meniscus elements.

38. The telecentric lens system of claim 35 wherein the first lens unit includes at least one element in addition to the meniscus elements, said element having a positive power.

39. The telecentric lens system of claim 35 wherein the two meniscus elements of the first lens unit are identical.

40. The telecentric lens system of claim 35 wherein the second lens unit includes a color-correcting doublet.

41. The telecentric lens system of claim 35 wherein the combined power of the two meniscus elements is negative.

42. A wide angle lens system which includes an aperture stop and which comprises:
(a) a first lens unit which comprises two meniscus elements whose concave surfaces face each other, the system's aperture stop being located between the two meniscus elements and each of said meniscus elements having a weak optical power whose absolute value is less than the absolute value of the optical power of the lens system; and
(b) a second lens unit which has a positive power; said lens system having a half angle field of view in the direction of the first lens unit of at least about 20 degrees.

43. The wide angle lens system of claim 42 wherein the system includes at least one aspheric lens surface.

44. The wide angle lens system of claim 42 wherein the first lens unit includes at least one element in addition to the meniscus elements, said element having a positive power.

45. The wide angle lens system of claim 42 wherein the two meniscus elements of the first lens unit are identical.

46. The wide angle lens system of claim 42 wherein the second lens unit includes a color-correcting doublet.

47. The wide angle lens system of claim 42 wherein the combined power of the two meniscus elements is negative.

* * * * *